United States Patent
Matsuda

(10) Patent No.: US 9,288,833 B2
(45) Date of Patent: Mar. 15, 2016

(54) COMMUNICATION APPARATUS AND CONTROL METHOD THEREOF

(71) Applicant: CANON KABUSHIKI KAISHA, Tokyo (JP)

(72) Inventor: Jun Matsuda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/250,146

(22) Filed: Apr. 10, 2014

(65) Prior Publication Data

US 2014/0315484 A1  Oct. 23, 2014

(30) Foreign Application Priority Data

Apr. 17, 2013  (JP) ................. 2013-086624

(51) Int. Cl.
*H04B 7/00* (2006.01)
*H04W 76/02* (2009.01)
*H04W 48/16* (2009.01)

(52) U.S. Cl.
CPC ............ *H04W 76/028* (2013.01); *H04W 48/16* (2013.01); *H04W 76/023* (2013.01)

(58) Field of Classification Search
CPC ..... H04W 16/14; H04W 52/24; H04W 84/18; H04W 88/06; H04W 48/16; H04W 8/005; H04W 76/023; H04M 1/7253
USPC .......................................... 455/39, 41.2, 412.1
See application file for complete search history.

(56) References Cited

U.S. PATENT DOCUMENTS

| | | | | |
|---|---|---|---|---|
| 5,812,907 A * | 9/1998 | Itoh | ...... | G03G 15/231 399/402 |
| 2002/0099853 A1* | 7/2002 | Tsujii | ...... | H04L 29/06 709/247 |
| 2003/0053130 A1* | 3/2003 | Omo | ...... | G06K 15/00 358/1.16 |
| 2009/0279848 A1* | 11/2009 | Taguchi | ...... | G11B 27/11 386/241 |
| 2013/0217434 A1* | 8/2013 | Chou | ...... | H04W 88/02 455/552.1 |

FOREIGN PATENT DOCUMENTS

JP  2009-152689 A  7/2009

* cited by examiner

*Primary Examiner* — April G Gonzales
(74) *Attorney, Agent, or Firm* — Canon U.S.A., Inc., IP Division

(57) ABSTRACT

A communication apparatus includes a connection unit configured to connect to a wireless network, a transmitting unit configured to transmit data by establishing communication with an external apparatus after connection to the wireless network, an interruption unit configured to interrupt the transmission of data, a storage unit configured to store interruption information relating to the transmission of data interrupted by the interruption unit, a search unit configured to disconnect the connection with the wireless network in a state in which the transmission of data is interrupted by the interruption unit, and then search for an external apparatus, and a determination unit configured to determine whether the external apparatus is found based on the interruption information stored in the storage unit and a search result from the search unit.

16 Claims, 12 Drawing Sheets

FIG. 6

| CONNECTION DEVICE ID | FILE ID | TRANSMITTED SIZE (BYTES) |
|---|---|---|
| 12:34:56:78:9a:bc | 100 | 8042 |

601, 602, 603

COMMUNICATION APPARATUS AND CONTROL METHOD THEREOF

BACKGROUND

1. Field

Aspects of the present invention generally relate to a communication apparatus that communicates with an external apparatus.

2. Description of the Related Art

With the spread of wireless communication, it is now possible to transmit an image file by mounting a wireless communication function even on a portable terminal, such as a digital camera (Japanese Patent Application Laid-Open No. 2009-152689). For example, when performing data communication using a wireless local area network (LAN), a method may be employed in which first a user joins a wireless LAN network, and then communication with an external apparatus on the network is established. However, after a connection based on a wireless layer and communication with an external apparatus have been established, if it is determined that the transmission and reception of data with the external apparatus cannot be performed properly, the connection processing performed up to that point is wasted. For example, when restarting the transmission of data that had been temporarily stopped, although communication needs to be performed with a specific counterparty, whether that counterparty is within the network is not known until the network is connected to.

SUMMARY

According to an aspect of the present invention, a communication apparatus includes a connection unit configured to connect to a wireless network, a transmitting unit configured to transmit data by establishing communication with an external apparatus after connection to the wireless network, an interruption unit configured to interrupt transmission of the data, a storage unit configured to store interruption information relating to transmission of the data interrupted by the interruption unit, a search unit configured to disconnect the connection with the wireless network in a state in which the transmission of data is interrupted by the interruption unit, and search for an external apparatus, and a determination unit configured to determine whether the external apparatus is found based on the interruption information stored in the storage unit and a search result from the search unit, wherein if it is determined by the determination unit that the external apparatus is found, the connection unit is configured to connect to the wireless network, and the transmitting unit is configured to restart transmission of the interrupted data by establishing communication with the external apparatus.

Further features of the present disclosure will become apparent from the following description of exemplary embodiments with reference to the attached drawings.

BRIEF DESCRIPTION OF THE DRAWINGS

FIG. 6 is a schematic diagram of interruption information.

DESCRIPTION OF THE EMBODIMENTS

Various exemplary embodiments will be described in detail below with reference to the drawings.

Hardware Configuration

A communication apparatus according to a first exemplary embodiment will now be described with reference to the drawings. Although the following will be described using a wireless LAN system based on the Institute of Electrical and Electronics Engineers (IEEE) 802.11 series as an example, the communication mode is not limited to a wireless LAN system based on IEEE 802.11.

A hardware configuration according to a preferable example of the present exemplary embodiment will now be described.

Figure 1:
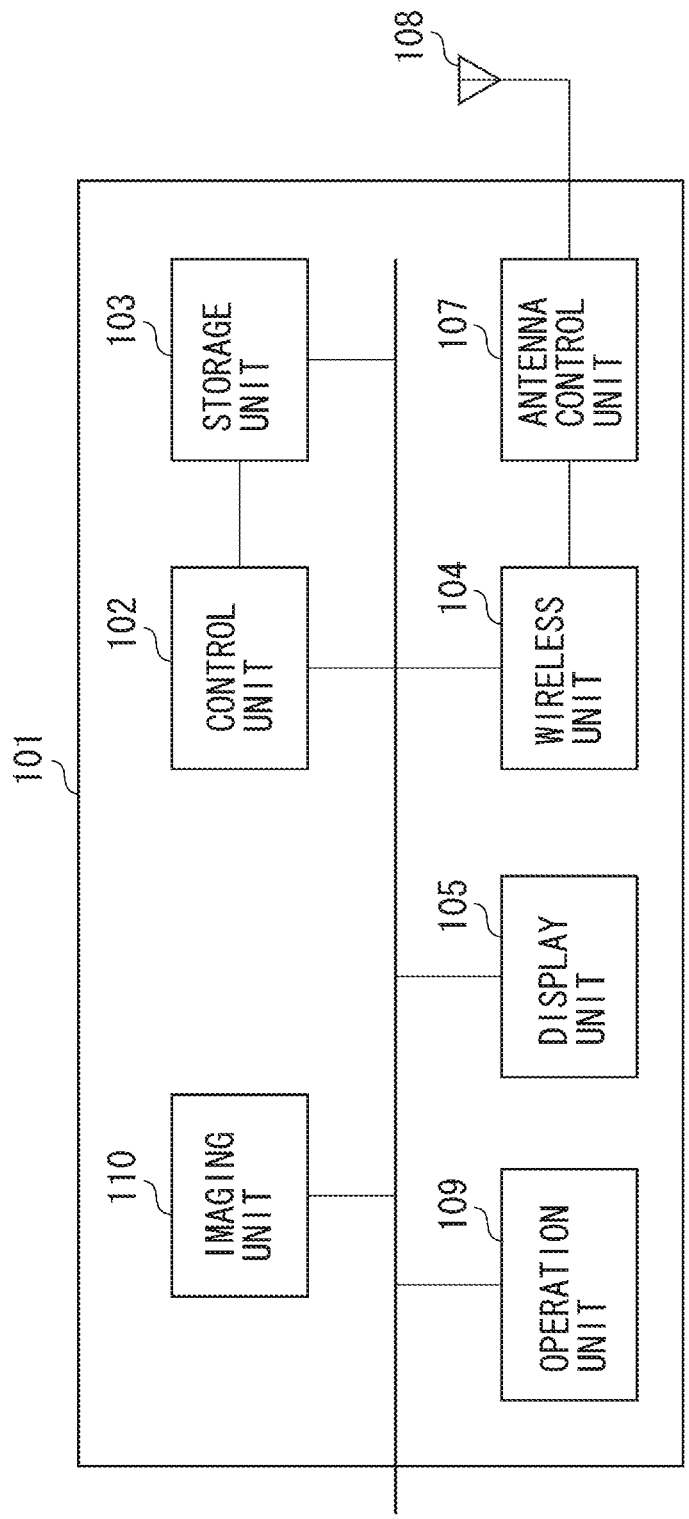
FIG. 1 illustrates hardware function blocks of a communication apparatus.

FIG. 1 is a block diagram illustrating an example of the configuration of the below-described apparatuses according to an exemplary embodiment.

FIG. 1 illustrates an overall apparatus 101.

A control unit 102 controls the overall apparatus by executing a control program stored in a storage unit 103. The control unit 102 includes one or a plurality of processors, such as a central processing unit (CPU) or a micro-processing unit (MPU). The control unit 102 also controls the setting of a communication parameter with another apparatus.

The storage unit 103 stores the control program executed by the control unit 102 and various information, such as a communication parameter. Further, image data and files generated by the communication apparatus or received from an external apparatus may also be stored in the storage unit 103. The storage unit 103 may be configured from various types of memory, such as a read-only memory (ROM), a random-access memory (RAM), a hard disk drive (HDD), and a flash memory. Each of the operations that are described below is performed by the control unit 102 executing a control program stored in the storage unit 103.

A wireless unit 104 performs wireless LAN communication based on the IEEE 802.11 series.

A display unit 105 for presenting various displays has a function of outputting visually perceivable information like a liquid crystal display (LCD) or a light-emitting diode (LED), or a function capable of outputting sound like a speaker. The display unit 105 includes at least either the function of outputting visual information or audio information.

An antenna control unit 107 transmits and receives signals by wireless communication by controlling an antenna 108.

An operation unit 109 lets the user perform various inputs for operating the communication apparatus. The operation unit 109 is configured from various buttons, a touch panel and the like.

An imaging unit 110, which includes an optical lens, a complementary metal oxide semiconductor (CMOS) sensor, a digital image processing unit and the like, generates image data by converting an analog signal input via the optical lens into digital data. The image data generated by the imaging unit 110 is stored in the storage unit 103.

Note that FIG. 1 is merely an example. The communication apparatus 101 may include hardware units other than the hardware units illustrated in FIG. 1.

Software Configuration

Figure 2:
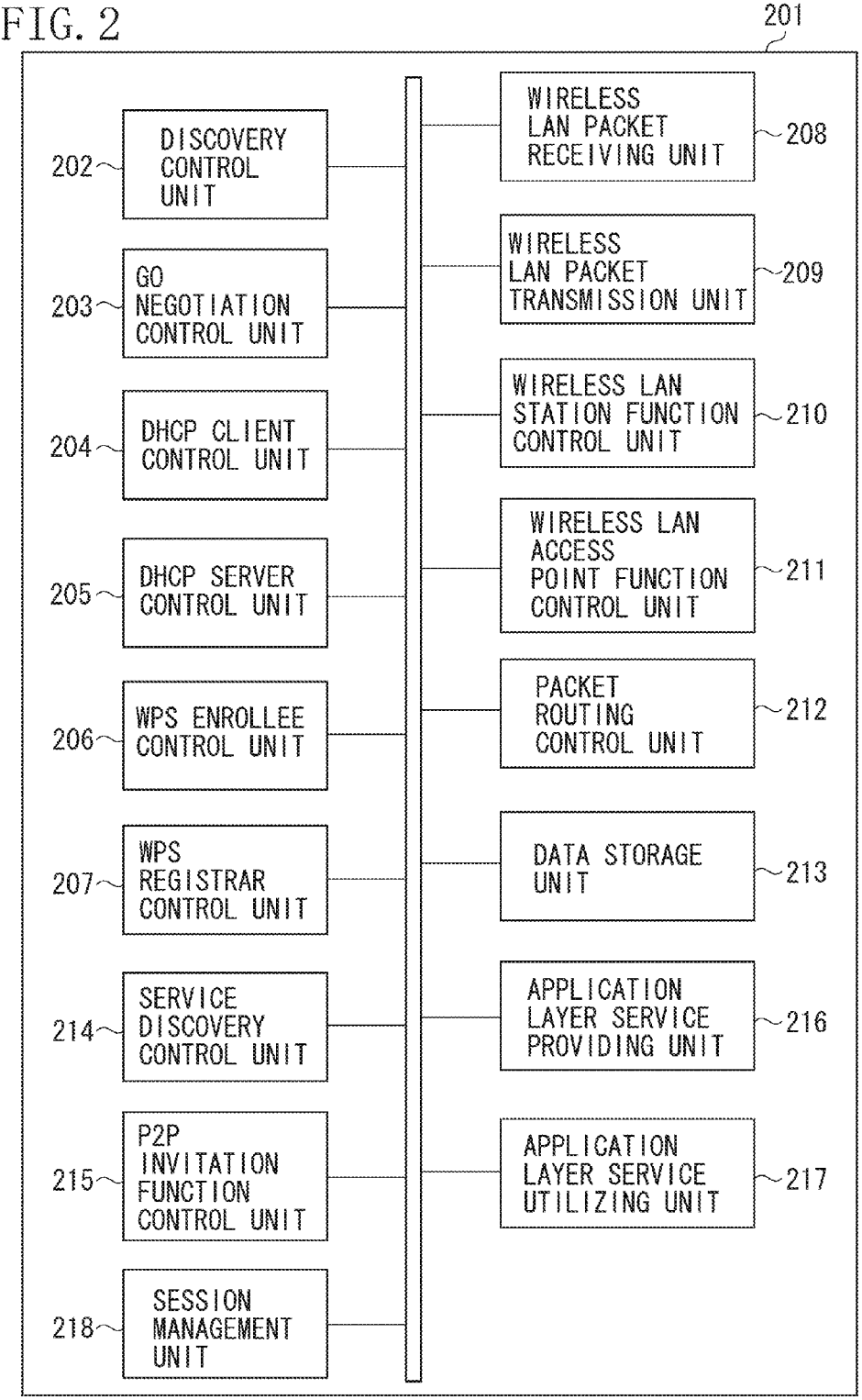
FIG. 2 illustrates software function blocks of a communication apparatus.

FIG. 2 is a block diagram illustrating an example of a configuration of the software function blocks executing the below-described communication control functions.

FIG. 2 illustrates an overall software function block 201.

A Discovery control unit 202 executes search processing for searching for a communication apparatus that will become a communication counterparty.

A GO Negotiation control unit 203 determines the role of apparatuses in the wireless layer, i.e., an apparatus which acts as a wireless LAN access point or an apparatus which acts as a wireless LAN station by performing control based on a Wi-Fi Direct protocol specification. In Wi-Fi Direct, the communication apparatus implementing the wireless LAN access point function is referred to as a peer-to-peer (P2P) group owner (hereinafter, "GO"), and the communication apparatus implementing the wireless LAN station function is referred to as a P2P client (hereinafter, "CL"). If the communication apparatus is a GO or wireless LAN access point, a below-described wireless LAN access point function control unit 211 is started. If the communication apparatus is a CL or wireless LAN station, a below-described wireless LAN station function control unit 210 is started. This GO Negotiation protocol is determined based on the Wi-Fi Direct® specification. Since this is not an important point of the present invention, a description thereof will be omitted here. In Wi-Fi Direct®, a network built by the GO is referred to as a P2P group. In the present specification too, a network may be sometimes described as a P2P group. In the present exemplary embodiment, these terms are used with the same meaning. Further, in the present specification, the P2P group owner (GO), the P2P client (CL), and communication apparatuses whose role has not yet been determined are collectively referred to as a P2P device.

A dynamic host configuration protocol (DHCP) client control unit 204 is started when the role of that communication apparatus is determined by the GO Negotiation control unit 203 to be a wireless LAN station.

A DHCP server control unit 205 is started when the role of that communication apparatus is determined by the GO Negotiation control unit 203 to be a wireless LAN access point.

A Wi-Fi protected setup (WPS) enrollee control unit 206 receives a communication parameter required for wireless LAN communication from another WPS registrar apparatus. Similar to the DHCP client control unit 204, the WPS enrollee control unit 206 is started when the role of that communication apparatus is a wireless LAN station.

A WPS registrar control unit 207 provides a communication parameter required for wireless LAN communication to another WPS enrollee apparatus. Similar to the DHCP server control unit 205, the WPS registrar control unit 207 is started when the role of that communication apparatus is a wireless LAN access point. The communication parameter provided by the WPS registrar is a parameter such as a service set identifier (SSID) as a network identifier, an encryption key, an encryption method, an authentication key, and authentication method and the like.

A wireless LAN packet receiving unit 208 and a wireless LAN packet transmission unit 209 control the transmission and reception of all packets, including those for higher layer transmission protocols.

The wireless LAN station function control unit 210 performs authentication/encryption processing when that communication apparatus operates as a wireless LAN station, and joins a wireless network built by an apparatus operating as a wireless LAN access point.

The wireless LAN access point function control unit 211 builds a wireless network when that apparatus operates as a wireless LAN access point, and performs authentication/encryption processing and management of the communication counterparty apparatuses. The wireless LAN station function control unit 210 and the wireless LAN access point function control unit 211 can be operated either separately or simultaneously.

A packet routing control unit 212 performs bridging and routing of communication packets when the wireless LAN access point function control unit 211 is operating.

A data storage unit 213 stores the software itself, wireless LAN parameters, and various tables such as a DHCP address table and an ARP table.

A service discovery control unit 214 controls a service discovery function that is unique to Wi-Fi Direct. The service discovery function exchanges service information held by a communication counterparty apparatus by transmitting and receiving an action frame described in IEEE 802.11u. Specifically, the service discovery control unit 214 transmits an SD query, and receives an SD response as a response. Alternatively, the service discovery control unit 214 receives an SD query from an apparatus counterparty, and transmits an SD response as a response. The SD response includes information indicating the type of service, specifically, a service such as a file transmitting service or a printing service.

A P2P invitation function control unit 215 controls an invitation function described in the Wi-Fi Direct standard. Since this invitation function is described in the Wi-Fi Direct standard, a description thereof will be omitted here, although it is a function that prompts a P2P device whose role as a GO device or as a CL device has not yet been determined to be connected as a P2P client.

A file transmitting service providing unit 216 provides a file transmitting service of an application layer. The term application layer refers to a service providing layer that is a fifth layer or higher in the open systems interconnection (OSI) reference model. The file transmitting service transmits and receives various requests and responses utilizing a hypertext transfer protocol (HTTP), and performs transmission and reception processing of a transmission file.

A file transmitting service utilization unit 217 in the application layer utilizes a service provided by the application layer file transmitting service providing unit 216 in the application layer of the counterparty apparatus.

A session management unit 218 manages a logical connection in the file transmitting service. When utilizing the file transmitting service, a session generating request is transmitted to the counterparty communication apparatus by transmitting information about a transmission file, and a response is received. When providing the file transmitting service, its determination is made depending on whether a session can be generated based on the content of the received transmission file information, and a response is issued. The transmission file information is information formed from the number of files, the total size, and the file names. If it is determined that a session can be generated, the session management unit 217 performs connection processing based on a wireless layer.

The exchange of information regarding session management is performed utilizing a Public Action frame defined in IEEE 802.11.

Not all of the function blocks illustrated in FIG. 2 have to be provided by software, it is acceptable if at least a portion of the function blocks are provided by hardware. Further, each of the function blocks illustrated in FIG. 2 is interrelated with the other blocks. Moreover, the respective function blocks illustrated in FIG. 2 are merely an example. A plurality of function blocks may configure one function block, or any of the function block may perform a plurality of functions.

Further, in the present exemplary embodiment, the file transmitting service in the application layer is realized by an apparatus that provides that service and an apparatus that utilizes that service. The service providing apparatus and the service utilizing apparatus may be a smartphone, a tablet, a digital camera or the like.

System Configuration

Figure 3:
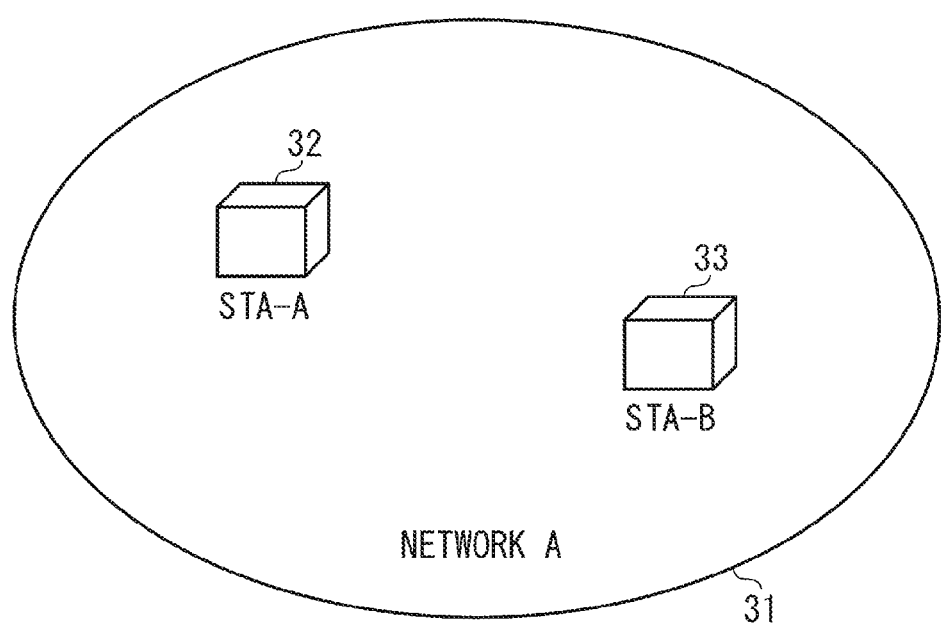
FIG. 3 illustrates an example of a network configuration.

FIG. 3 illustrates a network A31 (hereinafter, "network A") configured from a communication apparatus A32 (hereinafter, "STA-A") and a communication apparatus B33 (hereinafter, "STA-B"). All of these apparatuses have the configuration illustrated in the above-described FIGS. 1 and 2.

Basic Sequence

Figure 4:
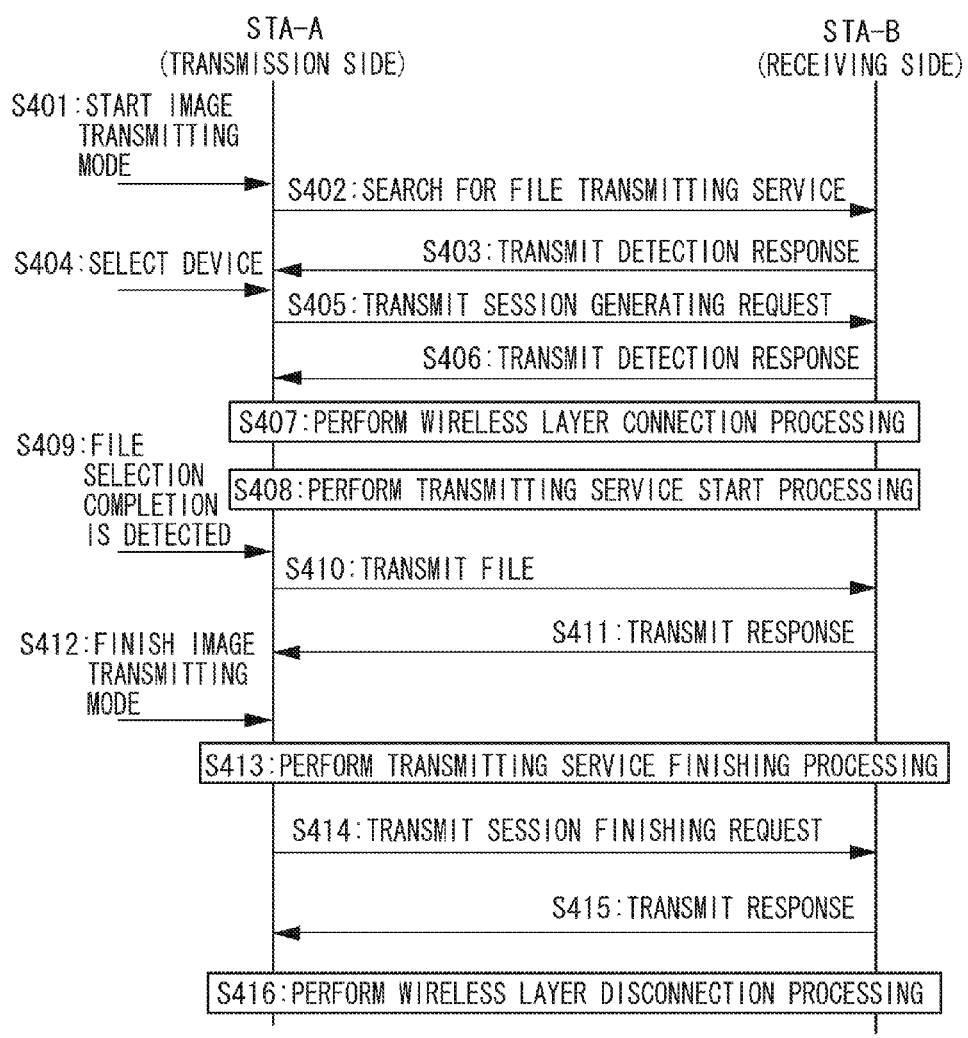
FIG. 4 is a sequence diagram between communication apparatuses.

FIG. 4 is a schematic diagram illustrating the basic operation sequence between communication apparatuses STA-A and STA-B when the STA-A transmits an image file stored in the storage unit 103 to the STA-B.

In the example illustrated in FIG. 4, the STA-A is operating as a communication apparatus on the transmission side utilizing the file transmitting service, and the STA-B is operating as a communication apparatus on the receiving side providing the file transmitting service.

In step S401, the STA-A receives an instruction to start an image transmitting mode based on a user operation. Then, in step S402, to utilize the file transmitting service, the STA-A transmits an inquiry signal for searching for the communication apparatus that is providing that service. In parallel with this processing, the STA-A receives a user operation for selecting a file to be transmitted.

In step S403, the STA-B, which has received the inquiry signal, transmits a detection response signal to the STA-A. This detection response signal includes, for example, a function ID of the STA-B and the services that the STA-B supports.

In step S404, the STA-A, which has received the detection response, selects the STA-B as a connection destination from among the devices. If the STA-A according to the present exemplary embodiment only detects one device, in this case detects only the STA-B, the STA-A automatically connects to the STA-B. Further, if a plurality of devices is detected, a list of the detected devices is displayed, and the connection destination is selected based on a user operation made via the operation unit 109.

Next, in step S405, the STA-A transmits a session generating request signal in order to establish a logical connection of the file transmitting service with the STA-B. Although in the present exemplary embodiment the file to be transmitted is selected after the session is generated, if the file to be transmitted is selected in advance, information about the file to be transmitted may be included in this session generating request signal. Examples of this information about the file to be transmitted include a file name, a file size, number of files and the like. By notifying the STA-B of this information in advance, the STA-B can also reject the generation per se of the session based on its own available space, for example.

In step S406, the STA-B, which has received the session generating request signal, confirms that the apparatus is in a state in which the file can be received, and transmits a success response signal to the STA-A.

After the success response is received, in step S407, the STA-A performs wireless layer connection processing with the STA-B. Connection processing based on a wireless layer is connection processing that is based on the above-described Wi-Fi Direct specification. Namely, either one of the STA-A or the STA-B becomes the P2P group owner (GO), and another becomes the P2P client (CL). A wireless layer connection is made by performing network joining processing, in which the CL joins a wireless network built by the GO.

After the wireless layer connection has been established, in step S408, the STA-A performs predetermined starting processing of the file transmitting service that includes the processing in an application layer. Specifically, the STA-A performs setting processing of an Internet protocol (IP) address based on DHCP, and processing for acquiring from the STA-B the detailed information required for the file transmitting service.

Next, in step S409, the STA-A detects the completion of the selection of the transmission file by a user operation that is executed in parallel. At this point, the file information about the file to be transmitted is fixed. If the selection of the transmission file has not been completed at this point, the STA-A waits for the selection to be completed.

In step S410, the STA-A transmits the image file selected in step S409 to the STA-B. Next, in step S411, after file reception has been completed, STA-B transmits a success response signal to the STA-A. If a plurality of files is selected, steps S410 and S411 are repeated a number of times equal to the number of selected files.

Then, in step S412, the STA-A receives a finishing instruction for the image transmitting mode based on a user operation, for example, and in step S413, performs predetermined finishing processing of the file transmitting service. Specifically, the STA-A executes processing to delete the information generated in step S407 and to cancel a setting.

Next, in step S414, the STA-A transmits a session finishing request signal to finish the logical connection of the file transmitting service with the STA-B. In step S415, the STA-B, which has received the session finishing request signal, transmits a success response signal to the STA-A.

In step S416, the STA-A, which has received the success response, performs processing to disconnect the wireless layer connection with the STA-B. The wireless layer disconnection processing is based on the above-described Wi-Fi Direct specification.

Interruption Processing

In FIG. 4, the basic flow of file transmission processing using a file transmitting service is described. However, generally, image files, especially moving image files, have a large file size, so that it often takes a long time for transmission. Accordingly, the STA-A and the STA-B according to the present exemplary embodiment are configured such that they can interrupt and restart the file transmission performed in step S410. The processing for interrupting file transmission performed in step S410 will now be described in more detail.

Figure 5:
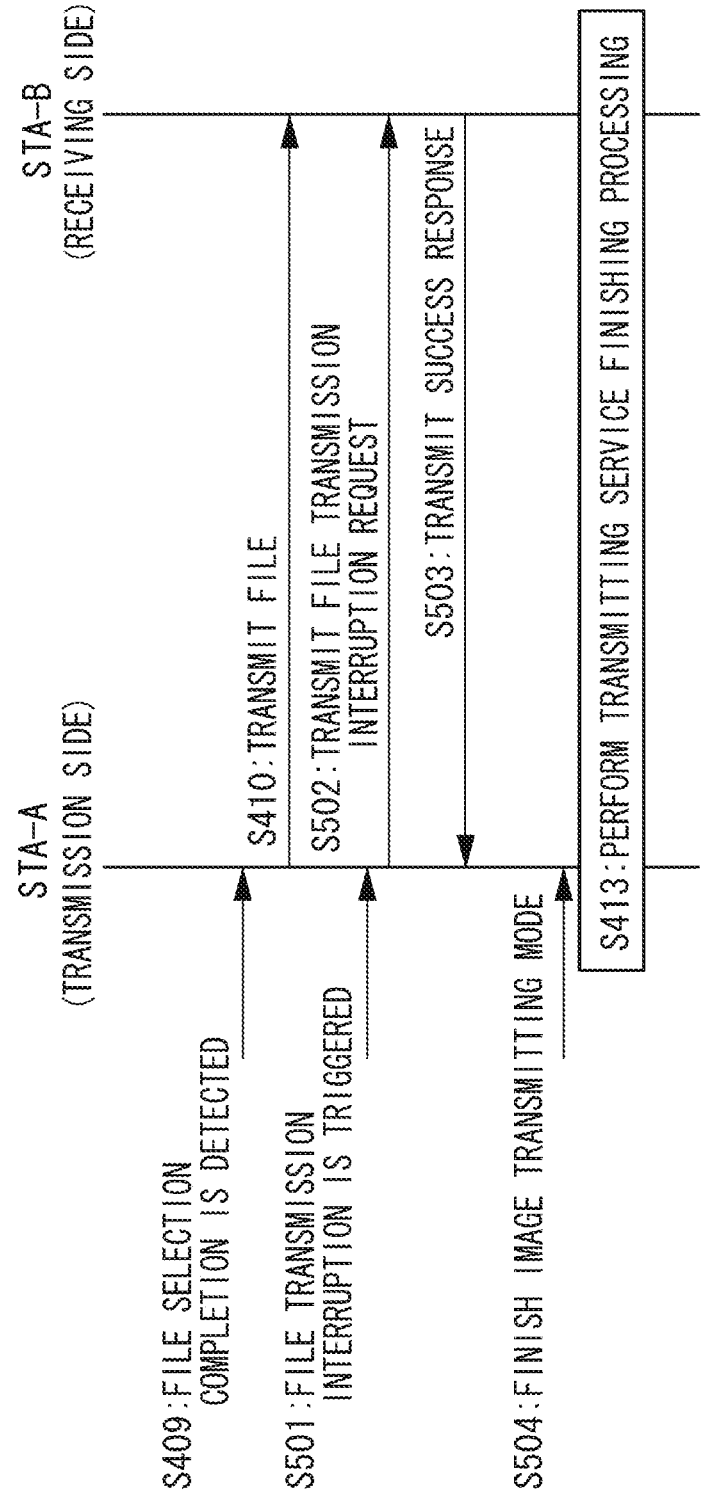
FIG. 5 is a sequence diagram between communication apparatuses.

FIG. 5 is a sequence diagram illustrating in detail interruption processing of file transmission performed in step S410 of FIG. 4. FIG. 5 illustrates a portion of FIG. 4 in more detail, and thus a description of the subject matter that is the same as FIG. 4 will be omitted.

First, in step S501, interruption processing has been triggered during file transmission. An example of a trigger for interrupting file transmission is a case where the user issues an instruction to interrupt via the operation unit 109. Other examples may include a case where an instruction has been issued via the operation unit 109 to capture an image of an object by the imaging unit 110, a case where the remaining battery level has dropped to a low level, or a case where the communication speed has become substantially slower due to a deterioration in the radio wave environment.

If interruption processing has been triggered during file transmission, in step S502, the control unit 102 transmits a file transmission interruption request to the STA-B.

In step S503, the STA-B, which has received the file transmission interruption request, transmits a success response signal. This success response signal includes the size of the file that has been received by the STA-B. The STA-A can recognize where to restart transmission processing that has been interrupted by referring to the size of the received file.

In step S504, the STA-A, which has received the success response signal, stores in the storage unit 103 interruption information about the ID of the file about which transmission is interrupted and the size of the file received in step S503. The interruption information will be described in more detail below.

After storage of the interruption information, in step S413, the STA-A performs ordinary transmitting service finishing processing. The above processing is the processing for interrupting file transmission.

Although an example is illustrated in FIG. 5 in which the interruption trigger occurs at the STA-A, the interruption trigger may also occur at the STA-B. In this case, the STA-B may transmit the file transmission interruption request to the STA-A during file transmission in step S410, and also transmit the file size of the received file at this time.

FIG. 6 illustrates the interruption information that is stored in the storage unit 103 of the STA-A when image file transmission from the STA-A to the STA-B is interrupted in the manner illustrated in FIG. 5.

The interruption information illustrated in FIG. 6 includes an ID 601 (identification information), such as a Mac Address of the device, that enables the transmitting device to be identified, and an ID 602 of the file about which transmission is interrupted. This ID may be any ID that can be internally identified by the device. For example, a file name or a file universal unique identifier (UUID) may be used. A transmitted size 603 stores the size of the received file included in the response in step S503 as a transmitted file. In the present exemplary embodiment, this information continues to be stored not only when the interruption information application layer is disconnected, but even when the wireless layer connection is disconnected.

In FIG. 6, although only one file ID of an untransmitted file is stored, if a plurality of files are selected, all of the file IDs about which transmission has not finished may be stored in the ID 602.

Further, although in this example the interruption information is stored in the STA-A, the interruption information may also be stored in the STA-B. If the STA-B manages the interruption information together with the file that is being received, when deleting the interruption information, it becomes easier to match the received file with the information on the receiving side by deleting also the file being received.

Although in the present exemplary embodiment, an example is described in which one piece of interruption data is stored, the interruption data may be stored as a plurality of data. Further, the most recent interruption information for each connection device may be stored. In this case, in the below-described restarting of transmission, the selection of the device to which file transmission is to be made, may be left up to the user.

Restart Processing

Figure 8:
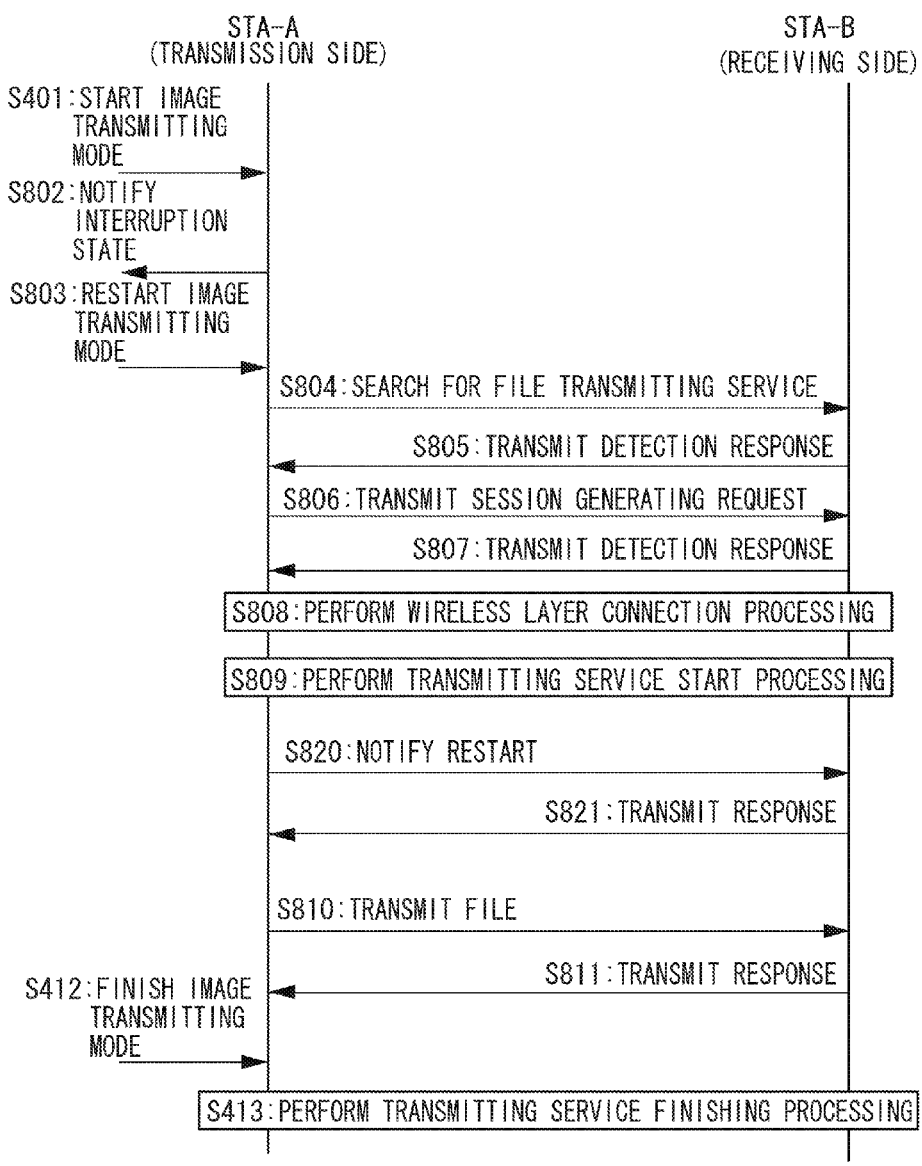
FIG. 8 is a sequence diagram between communication apparatuses.

FIG. 8 illustrates processing for restarting transmission from the STA-A to the STA-B after the interruption processing illustrated in FIG. 5 has been performed. Description of the subject matter that is the same as FIG. 4 will be omitted.

In step S801, similar to step S401, when the STA-A receives an instruction to start a file transmitting mode, the STA-A refers to the interruption information in the data storage unit 213, and determines whether there is transmission processing to STA-B that is interrupted. If it is determined that there is interrupted transmission processing (YES in Step 801), in step S802, the STA-A displays the screen illustrated in FIG. 5 on the display unit 105.

Figure 7:
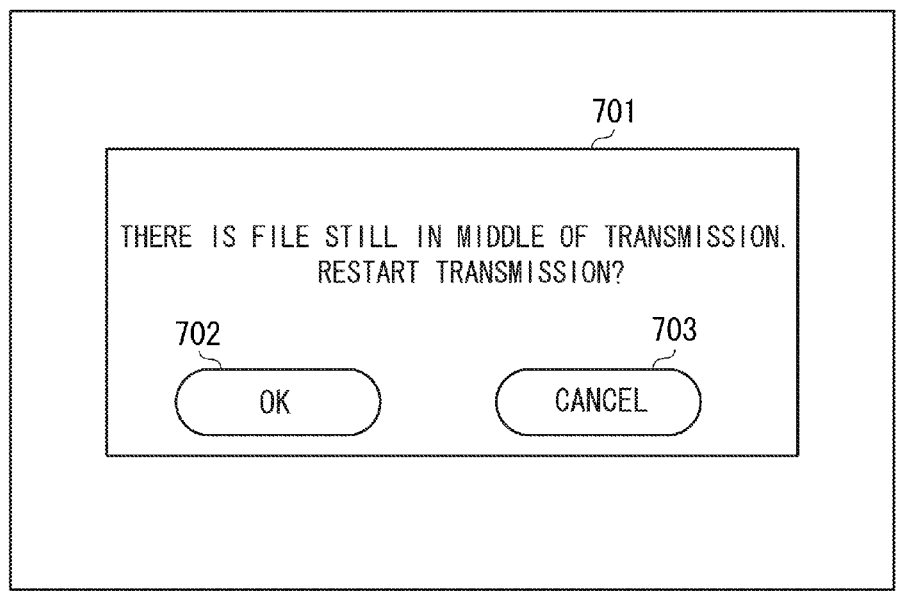
FIG. 7 illustrates an example of a GUI screen of a communication apparatus.

The screen illustrated in FIG. 7 notifies that the interrupted file transmission can be restarted. A dialog 702 notifies the user of the existence of a file about which transmission is interrupted, and asks whether transmission may be restarted. If an OK button 702 is pressed, processing for restarting the interrupted file transmission is started. Further, if a Cancel button 703 is pressed, instead of restarting the interrupted file transmission, ordinary processing for transmitting a file is started. In the case of notifying the file size and file name before generating the session, the notification may be made in consideration of the interruption information. For example, the file size or the portion of the file that has not yet been received by the counterparty (total size of the file minus the already transmitted size) may be notified. Further, a file name that indicates to the counterparty that transmission is the continuation of a file about which transmission is interrupted may be notified. For example, if the transmission of a file named "001.jpg" is interrupted, a file name called "001_part.jpg" may be notified when restarting. In this case, after receiving the file name "001_part.jpg", the STA-B recognizes that transmission of an interrupted file is to restart based on the fact that the "_part" is included in the file name. Further, the STA-B can also recognize that the target for restarting transmission is the "001.jpg" that excludes "_part" from the notified file name.

Returning to the description of FIG. 8, after the screen illustrated in FIG. 7 is displayed and pressing of the OK button 702 is detected, in step S803, the STA-A proceeds to a sequence for restarting the interrupted file transmission.

In steps S804 and S805, the same processing is performed as in steps S402 and S403.

When the STA-A receives the detection response signal, the STA-A determines whether the connection device ID included in the interruption information in the data storage unit 213 and the device ID included in the detection response signal obtained as a search result are the same. If it is determined that these IDs are the same, in step S806, the STA-A transmits a session generating request. By processing in this manner, the STA-A can connect with a device for which file transmission had been interrupted.

In steps S807 to S809, a connection based on a wireless layer and an application layer with the STA-B is established by performing the same processing as in steps S405 to S407 of FIG. 4.

After the transmitting service starting processing in step S809 has finished, in step S810, based on the interruption information, the STA-A restarts transmission of the interrupted file (interruption file). When restarting the transmission of an interruption file, in step S820, the STA-A first notifies the STA-B that transmission of the interruption file is to be restarted. Based on this notification, the STA-B recognizes that the STA-A is trying to restart transmission of the interruption file.

In step S821, the STA-B determines whether it still has the interruption file, and issues a response regarding that determination result to the STA-A.

If the STA-A receives a response that the STA-B has the interruption file, the STA-A restarts transmission of the interruption file. Specifically, if the interruption information illustrated in FIG. 6, for example, is stored, the STA-A reads the file corresponding to the file ID from the storage unit 103, and starts transmission from byte 8,042, which is the transmitted size. On the other hand, if the STA-A receives a response that the STA-B does not have the interrupted file, instead of transmitting just a part of the file, the STA-A transmits the file from the start again. This is because if the STA-B does not have the interrupted file, even if a part of the interrupted file is transmitted by the STA-A, the whole file cannot be obtained on the STA-B side.

In step S811, when the STA-B completes reception of the file, the STA-B transmits a success response signal to the STA-A. Then, the STA-B performs the same finishing processing as in FIG. 4.

Processing Flow

Figure 9:
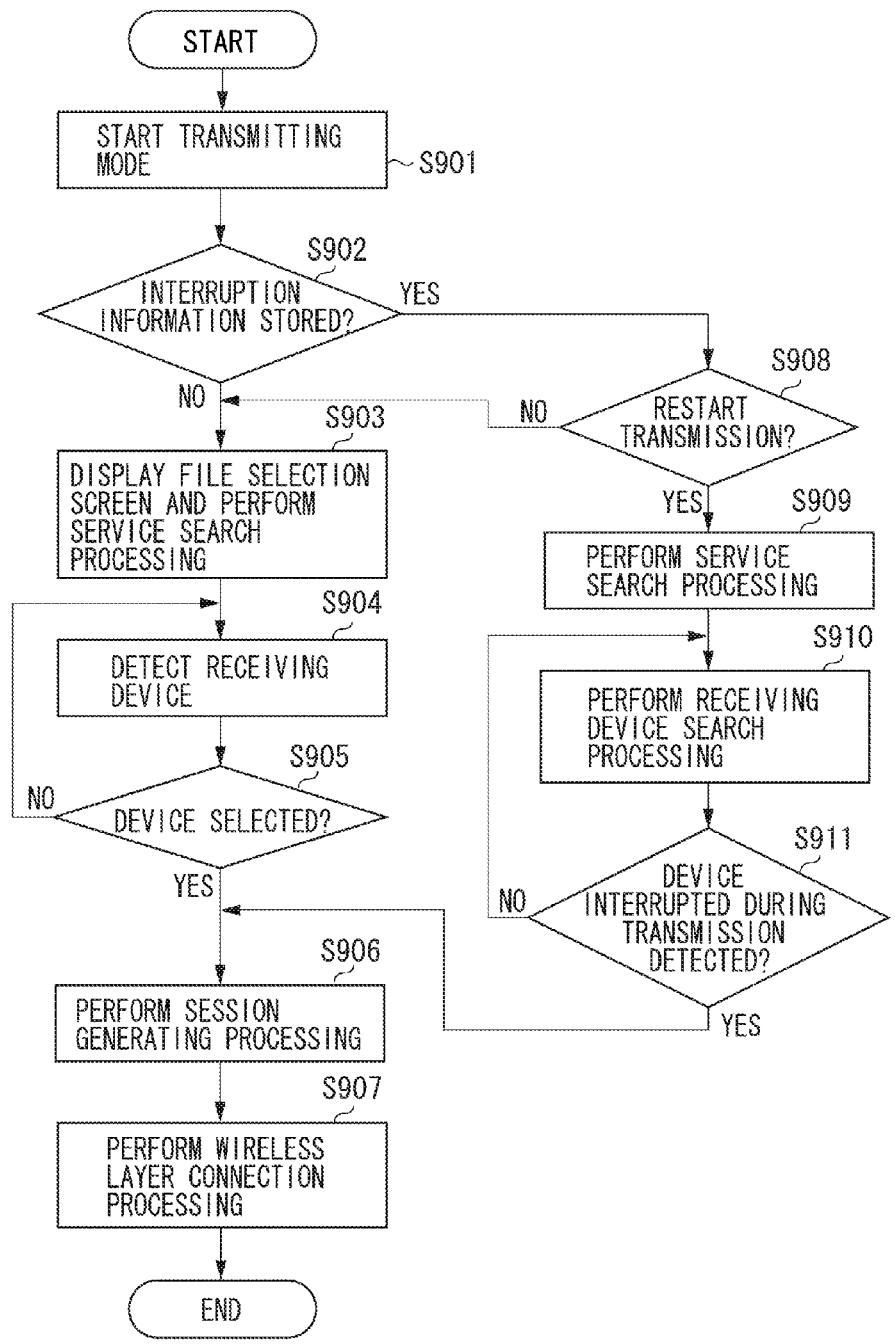
FIG. 9 is a flowchart illustrating operation of a communication apparatus.

Next, the operations between the STA-A and the STA-B until a connection is made based on a wireless layer will be described with reference to the flowchart illustrated in FIG. 9. The flowchart illustrated in FIG. 9 is started based on the reception of an instruction to start an image transmitting mode via the operation unit 109. Each step in this flowchart is executed by the control unit 102 controlling the respective units in the STA-A based on a program stored in the storage unit 103.

In step S901, the control unit 102 starts a transmitting mode.

In step S902, the control unit 102 determines whether interruption information is stored by referring to the storage unit 103. If it is determined that interruption information is not stored (NO in step S902), the processing proceeds to step S903, and if it is determined that interruption information is stored (YES in step S902), the processing proceeds to step S908.

First, the case where step S903 is executed will be described. In this case, since interruption information is not stored, ordinary file transmission processing is executed. In step S903, the control unit 102 displays via the display unit 105 a screen that lets the user select the transmission file. In parallel with this processing, the control unit 102 performs search processing for the file transmitting service.

Next, in step S904, the control unit 102 receives a response to the search, and detects the devices supporting the file transmitting service. Then, the control unit 102 displays a list of the devices supporting the file transmitting service via the display unit 105.

Next, in step S905, the control unit 102 determines whether a device has been selected by a user operation. If it is determined that a device has been selected (YES in step S905), the processing proceeds to step S906, and if it is determined that a device has not been selected (NO in step S905), the processing returns to step S904.

Next, in step S906, the control unit 102 performs session generating processing of the file transmitting service. The specific procedure for the session generating processing is described with reference to FIG. 4.

After the session generation, in step S907, the control unit 102 performs wireless layer connection processing based on the Wi-Fi Direct specification with the receiving device. Further, the control unit 102 performs IP address setting processing based on DHCP, and acquisition processing of the detailed information required for transmission in the file transmitting service, and then finishes the wireless connection layer connection.

Next, the case will be described where it is determined in step S902 that interruption information is stored, so that the processing proceeds to step S908. In this case, the STA-A restarts the interrupted transmission processing.

In step S908, the control unit 102 displays the screen illustrated in FIG. 7 on the display unit 105, and waits for a user selection. If the OK button 702 is pressed (YES in step S908), the processing proceeds to step S909. If the Cancel button 703 is pressed (NO in step S908), the processing proceeds to step S903, and the control unit 102 executes ordinary transmission processing.

Next, in step S909, the control unit 102 searches for the file transmitting service, and receives responses from other devices. Then, in step S910, similar to step S904, the control unit 102 detects the devices supporting the file transmitting service.

In step S911, the control unit 102 compares the connection device ID in the interruption information and the device IDs included in the device responses detected in step S904, and determines whether a device about which transmission is interrupted has been detected. If a device is not detected (NO in step S911), the processing returns to step S910. If a device is detected (YES in step S911), the processing proceeds to step S906.

Thus, according to the present exemplary embodiment, if file transmission has been interrupted, re-connection with the interrupted device and the restart of file transmission are prioritized. Consequently, the user can restart an interrupted file transmission in a fewer steps.

In the present exemplary embodiment, although a transmission file selection operation can be received after the transmitting mode has started, but before connection based on a wireless layer, selection of the transmission file can also be performed after connection based on a wireless layer (step S407) is performed.

Further, in the present exemplary embodiment, although the restart trigger after file transmission is interrupted, is the start of the file transmitting mode by a user operation, some other trigger may be employed. For example, if the interruption occurs because of the start of image capture, the user may be prompted to reconnect when communication becomes possible after image capture has finished. Further, if the interruption occurs because of a low battery level, the user may be prompted to reconnect after the battery has been replaced.

In addition, in the present exemplary embodiment, although notification of the transmission of the interruption file from the STA-A to the STA-B is performed when actually performing the file transmission, this notification may also be performed when the session generating request is transmitted.

In the first exemplary embodiment, if there is interruption information on the STA-A side when the transmitting mode has started, an inquiry regarding whether to start restart processing is transmitted to the user. However, in a second exemplary embodiment, if there is interruption information on the STA-A side when the transmitting mode has started, first, a search is performed. Then, an inquiry regarding whether a counterparty for which transmission is restarted has been found is transmitted to the user. This prevents the user from having to perform an unnecessary operation if there are no counterparties around that apparatus to which transmission is restarted.

Since there are many common portions with the first exemplary embodiment, the present exemplary embodiment will be described with a focus on its specific features while omitting a description of the common portions.

Figure 10:
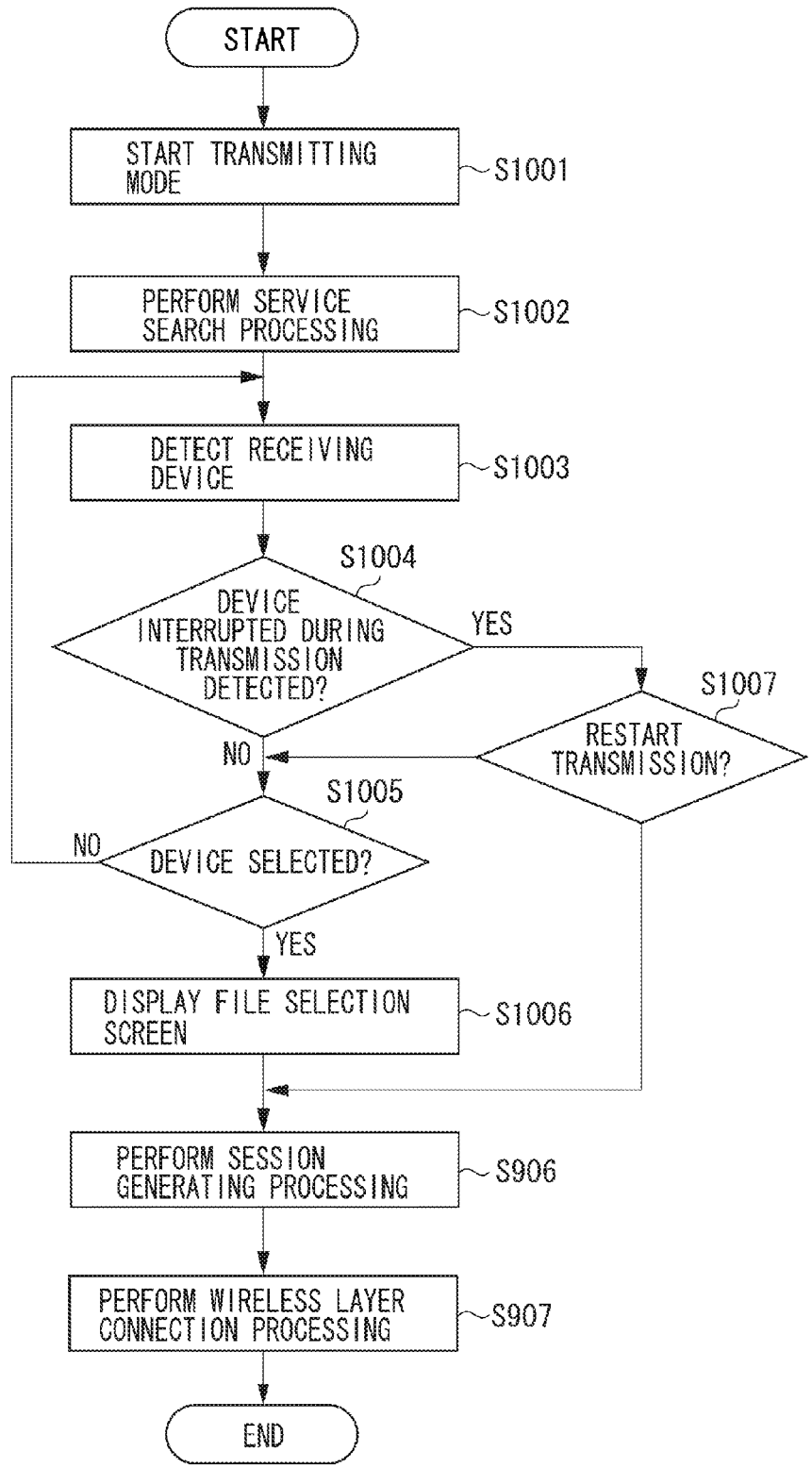
FIG. 10 is a flowchart illustrating operation of a communication apparatus.

FIG. 10 is a flowchart illustrating the operations until wireless layer of the communication apparatus transmitting a file stored in the storage unit 103 is connected to a receiving device, by utilizing a file transmitting service. Each step of the flowchart is processed by a control unit 102 carrying out a program stored in the storage unit 103.

In step S1001, the control unit 102 starts a transmitting mode.

In step S1002, the control unit 102 executes file transmitting service search processing. The execution of search processing without displaying the screen illustrated in FIG. 7 is a difference from the first exemplary embodiment.

Next, in step S1003, the control unit 102 receives a response to the search, and detects devices supporting the file transmitting service.

Next, in step S1004, the control unit 102 compares information about the devices detected in step S1003 and the connection device IDs stored in the data storage unit 213, and determines whether a device about which transmission is interrupted has been found. If it is determined that a device about which transmission is interrupted has been found (YES in step S1004), the processing proceeds to step S1007, and if it is determined that a device about which transmission is interrupted has not been found (NO in step S1004), the processing proceeds to step S1005.

In step S1005, the control unit 102 lets the user select which device to perform file transmission processing from among the devices detected in step S1003. Specifically, the control unit 102 displays a list of the detected devices on the display unit 105, and receives a selection operation from the user via the operation unit 109. If it is determined that a device has been selected by a user operation (YES in step S1005), the processing proceeds to step S1006. If it is determined that a device has not been selected by a user operation (NO in step S1005), the processing returns to step S1003.

In step S1006, the control unit 102 displays a file selection screen on the display unit 105, and starts reception of a selection by a user operation of the file to be transmitted. Then, the processing proceeds to step S906.

Figure 11:
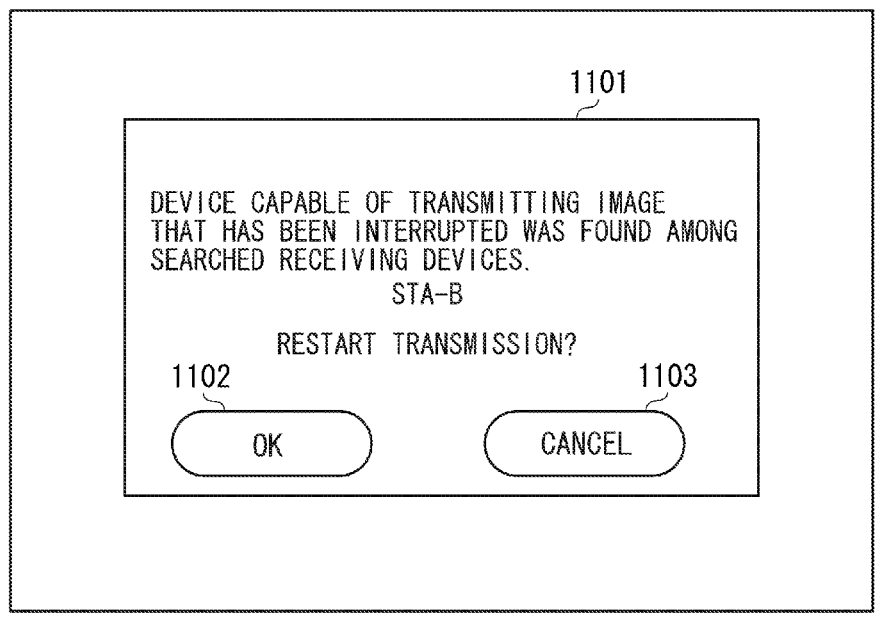
FIG. 11 illustrates an example of a GUI screen of a communication apparatus.

Next, the case where the processing proceeds from to step S1004 to S1007 will be described. In step S1007, the control unit 102 displays a screen that lets the user select whether to restart transmission of an interrupted image based on a user operation. If it is determined that restart is selected (YES in step S1007), the processing proceeds to step S906. If it is determined that restart is not selected (NO in step S1007), the processing proceeds to step S1005. An example of the selection screen is illustrated in FIG. 11. A guidance message 1101 notifies the user that a device about which transmission is interrupted has been detected. An OK button 1102 is for instructing the restart of transmission. If the OK button 1102 is selected, the processing proceeds to step S906. A Cancel button 1103 is for instructing that the restart of transmission is not performed. If the Cancel button 1103 is selected, the processing proceeds to step S1105.

If the processing proceeds to step S906, the session generating processing and wireless layer connection processing are performed in the same manner as in steps S906 and S907 of FIG. 9.

Thus, according to the present exemplary embodiment, concerning the detected devices, it is possible to proceed to the re-connection and the transmission restart sequence only when a device having information for which file transmission is interrupted is found.

In the second exemplary embodiment, if a device about which transmission has been interrupted is detected, connection is made to that device. In contrast, in the third exemplary embodiment, a configuration will be described in which the detected device is selected based on a user operation.

Since there are many common portions with the second exemplary embodiment, the present exemplary embodiment will be described with a focus on its specific features while omitting a description of the common portions.

Figure 12:
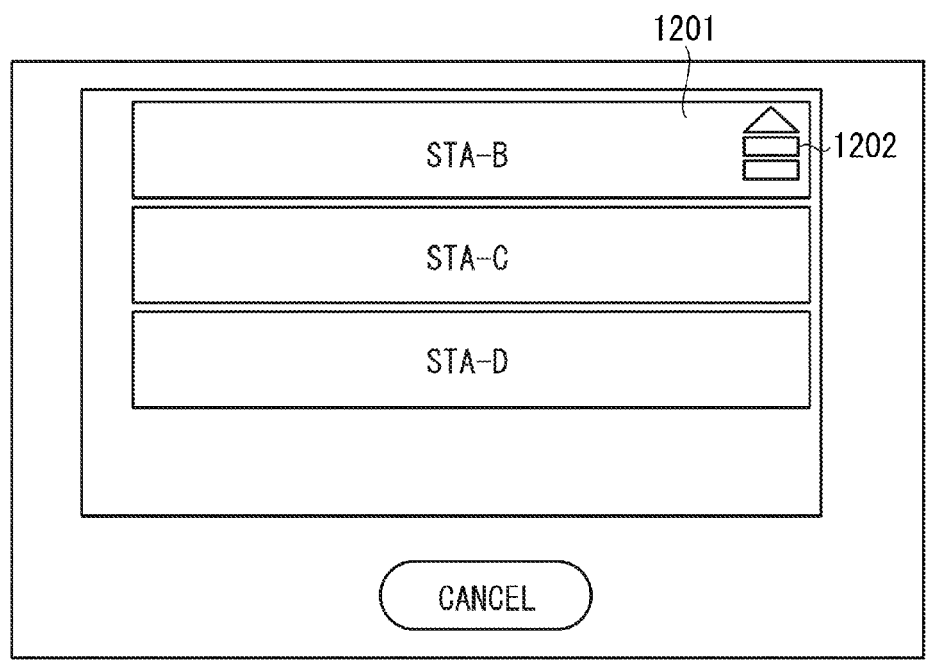
FIG. 12 illustrates an example of a GUI screen of a communication apparatus.

In the present exemplary embodiment, after the control unit 102 performs the detection processing in step S1003 of FIG. 10, the control unit 102 displays a list of the detected devices. FIG. 12 illustrates an example of the displayed screen.

The example illustrated in FIG. 12 includes a device name 1201 of a detected device. This example illustrates a case in which "STA-B", "STA-C", and "STA-D" are detected. The user can select a desired device. An interruption icon 1202 is displayed next to the device name of devices having interruption information. In the example illustrated in FIG. 12, the user can recognize that there is interrupted transmission processing for STA-B.

If the STA-B is selected on the screen in FIG. 12, the processing proceeds to step S1007 of FIG. 10, and the control unit 102 receives the selection regarding whether to restart transmission. If STA-C or STA-D is selected, the processing proceeds to step S1006, and the control unit 102 receives the operation for selecting the file to be transmitted.

Thus, according to the present exemplary embodiment, by displaying the list of devices so that the user can understand which devices have interrupted file transmission, the user can select not only an interrupted device, but also any connectable device.

In the screen illustrated in FIG. 12, devices about which transmission processing has been interrupted may be preferentially displayed, for example, displayed at the top of the display list.

Although the above exemplary embodiments were described using a wireless LAN based on IEEE 802.11 as an example, other types of wireless communication, such as wireless universal serial bus (USB), MBOA, Bluetooth®, ultra-wide band (UWB), and ZigBee®, are applicable. Further, the above exemplary embodiments may also be applicable to wired communication mediums, such as wired LAN. MBOA is an abbreviation for MultiBand OFDM Alliance. Further, UWB includes wireless USB, wireless 1394, WINET and the like.

Other Embodiments

Additional embodiments can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2013-086624 filed Apr. 17, 2013, which is hereby incorporated by reference herein in its entirety.

What is claimed is:

1. A transmitting apparatus comprising:
a connection unit configured to connect to a wireless network;
a transmitting unit configured to transmit data by establishing communication with a receiving apparatus after connection to the wireless network;
an interruption unit configured to interrupt transmission of the data;
a storage unit configured to store interruption information relating to the transmission of data interrupted by the interruption unit;
a search unit configured to search for an external apparatus after the transmitting apparatus disconnects the connection with the wireless network in a state in which the transmission of data is interrupted by the interruption unit; and
a determination unit configured to determine whether the receiving apparatus is found based on the interruption information stored in the storage unit and a search result from the search unit,
wherein if it is determined by the determination unit that the receiving apparatus is found, the connection unit is configured to connect to the wireless network, and the transmitting unit is configured to restart the transmission of interrupted data by establishing communication with the receiving apparatus.

2. The transmitting apparatus according to claim 1, wherein the interruption information includes identification information about the receiving apparatus for which data transmission is interrupted.

3. The transmitting apparatus according to claim 2, wherein the determination unit is configured to determine whether the receiving apparatus is found by comparing the identification information included in the interruption information and the search result by the search unit.

4. The transmitting apparatus according to claim 1, wherein the interruption information includes a size of data previously received by the external apparatus.

5. The transmitting apparatus according to claim 4, wherein the transmitting unit is configured to, in a case of restarting transmission of interrupted data, transmit data that has not been transmitted to the receiving apparatus based on the size of the previously received data included in the interruption information.

6. A method for controlling a transmitting apparatus, the method comprising:
connecting to a wireless network;
transmitting data by establishing communication with a receiving apparatus after connection to the wireless network;
interrupting the transmission of the data;
storing interruption information relating to the transmission of the interrupted data;
searching for an external apparatus after the transmitting apparatus disconnects the connection with the wireless network in a state in which the transmission of data is interrupted; and
determining whether the receiving apparatus is found based on the stored interruption information and a search result, wherein if it is determined that the receiving apparatus is found, a connection is made to the wireless network, and transmission of the interrupted data is restarted by establishing communication with the receiving apparatus.

7. The transmitting apparatus according to claim 1, further comprising a notification unit configured to make notification of existence of the interrupted data in a case where the interruption information is stored in the storage unit in a mode for transmitting data by the transmitting unit.

8. The transmitting apparatus according to claim 7, wherein the notification unit is configured to make notification that transmission of the interrupted data is able to be restarted.

9. The transmitting apparatus according to claim 1, further comprising a notification unit configured to make notification of existence of the receiving apparatus in a case where the receiving apparatus is included in at least one external apparatus searched for by the search unit.

10. The transmitting apparatus according to claim 9, wherein the notification unit is further configured to make notification that transmission of the interrupted data is able to be restarted.

11. The transmitting apparatus according to claim 1, further comprising a display unit configured to display at least one external apparatus searched for by the search unit, wherein the display unit is configured to display the receiving apparatus and another apparatus in such a way that the receiving apparatus is distinguishable from the other apparatus.

12. The transmitting apparatus according to claim 1,
wherein the determination unit is further configured to determine whether the receiving apparatus has the interrupted data if it is determined by the determination unit that the receiving apparatus is found, and
wherein the transmitting unit is configured to restart the transmission of interrupted data if the determination unit determines that the receiving apparatus has the interrupted data.

13. The transmitting apparatus according to claim 12, wherein the transmitting unit is configured to transmit all data corresponding to the interrupted data in a case where the determination unit determines that the receiving apparatus does not have the interrupted data.

14. The transmitting apparatus according to claim 1, wherein the connection unit is configured to connect to the wireless network in a manner based on a Wi-Fi Direct standard.

15. The transmitting apparatus according to claim 1, wherein the connection unit is configured to connect to the wireless network created by the transmitting apparatus or the receiving apparatus operating as an access point.

16. A non-transitory computer readable storage medium storing computer executable instructions that cause a computer to execute a method for controlling a transmitting apparatus, the method comprising:
connecting to a wireless network;

transmitting data by establishing communication with a receiving apparatus after connection to the wireless network;

interrupting the transmission of the data;

storing interruption information relating to the transmission of the interrupted data;

searching for an external apparatus after the transmitting apparatus disconnects the connection with the wireless network in a state in which the transmission of data is interrupted; and determining whether the receiving apparatus is found based on the stored interruption information and a search result, wherein if it is determined that the receiving apparatus is found, a connection is made to the wireless network, and transmission of the interrupted data is restarted by establishing communication with the receiving apparatus.

* * * * *